United States Patent [19]

Hovila

[11] 3,969,051
[45] July 13, 1976

[54] VULCANIZING APPARATUS
[75] Inventor: Harry Hovila, Bothell, Wash.
[73] Assignee: D.G. Rung Industries, Inc., Seattle, Wash.
[22] Filed: June 13, 1975
[21] Appl. No.: 586,818

[52] U.S. Cl. ............................... 425/11; 425/28 B; 425/384; 425/394; 425/405 R; 425/406; 425/DIG. 19
[51] Int. Cl.² ......................................... B29D 29/04
[58] Field of Search .................. 425/11, 28 B, 34 B, 425/39, 43, 384, 394, 411, 405 R, 406, DIG. 9, 407, 174.4; 144/281; 100/204; 249/80

[56] References Cited
UNITED STATES PATENTS

| | | | |
|---|---|---|---|
| 1,777,310 | 10/1930 | Hopkinson | 425/28 B X |
| 2,363,779 | 11/1944 | Duffy et al. | 144/281 |
| 2,627,628 | 2/1953 | Pare | 249/80 |
| 2,717,421 | 9/1955 | Beeson | 425/411 |
| 2,869,173 | 1/1959 | Van Harteweldt et al. | 425/DIG.19 |
| 2,874,751 | 2/1959 | Norton | 425/407 X |
| 3,135,998 | 6/1964 | Fowler et al. | 425/DIG.19 |
| 3,152,364 | 10/1964 | Alen | 425/DIG.19 |
| 3,237,252 | 3/1966 | Ratcliffe | 425/405 R X |
| 3,284,858 | 11/1966 | Taccone | 425/DIG.19 |
| 3,533,352 | 10/1970 | Miller | 425/174.4 X |
| 3,808,968 | 5/1974 | Notin | 100/264 |
| 3,881,852 | 5/1975 | Ahrweiler | 425/406 X |

Primary Examiner—J. Howard Flint, Jr.
Attorney, Agent, or Firm—Christensen, O'Connor, Garrison & Havelka

[57] ABSTRACT

The vulcanizing apparatus of the present invention can be used for vulcanizing spliced sections of rubber belting, sheeting or the like. The apparatus includes an upper platen assembly and a lower platen assembly. The upper platen assembly includes an upper frame member and a sheet-like platen member having a relatively rigid platen surface. The platen member is affixed to an upper frame member. A heat exchanger, a heating pad and a layer of insulation are sandwiched between the sheet-like platen member and the upper frame member. The lower platen assembly includes a lower frame member and a sheet-like platen member having a relatively rigid platen surface, below which are interposed in sandwiched relationship a heat exchanger, a heating pad, and a layer of insulation. The layer of insulation rests upon a flexible diaphragm that has a flexible surface substantially co-extensive with the lower platen surface. The peripheral portions of the diaphragm surrounding the platen surface co-extensive portion are affixed to a lower frame member in sealed relationship, forming a fluid pressure chamber between the lower surface of the diaphragm and the lower frame member. An inlet to the pressure chamber is provided for admitting a fluid under pressure into the chamber and for exhausting the fluid. Connecting members, in the form of bolts pivotally mounted to the lower frame member and removably secured in appropriately positioned slots in the upper frame member, position and hold the upper platen surface in mutually opposing spaced relationship to the lower platen surface when a belt or other material to be vulcanized is interposed between the two platen surfaces.

11 Claims, 4 Drawing Figures

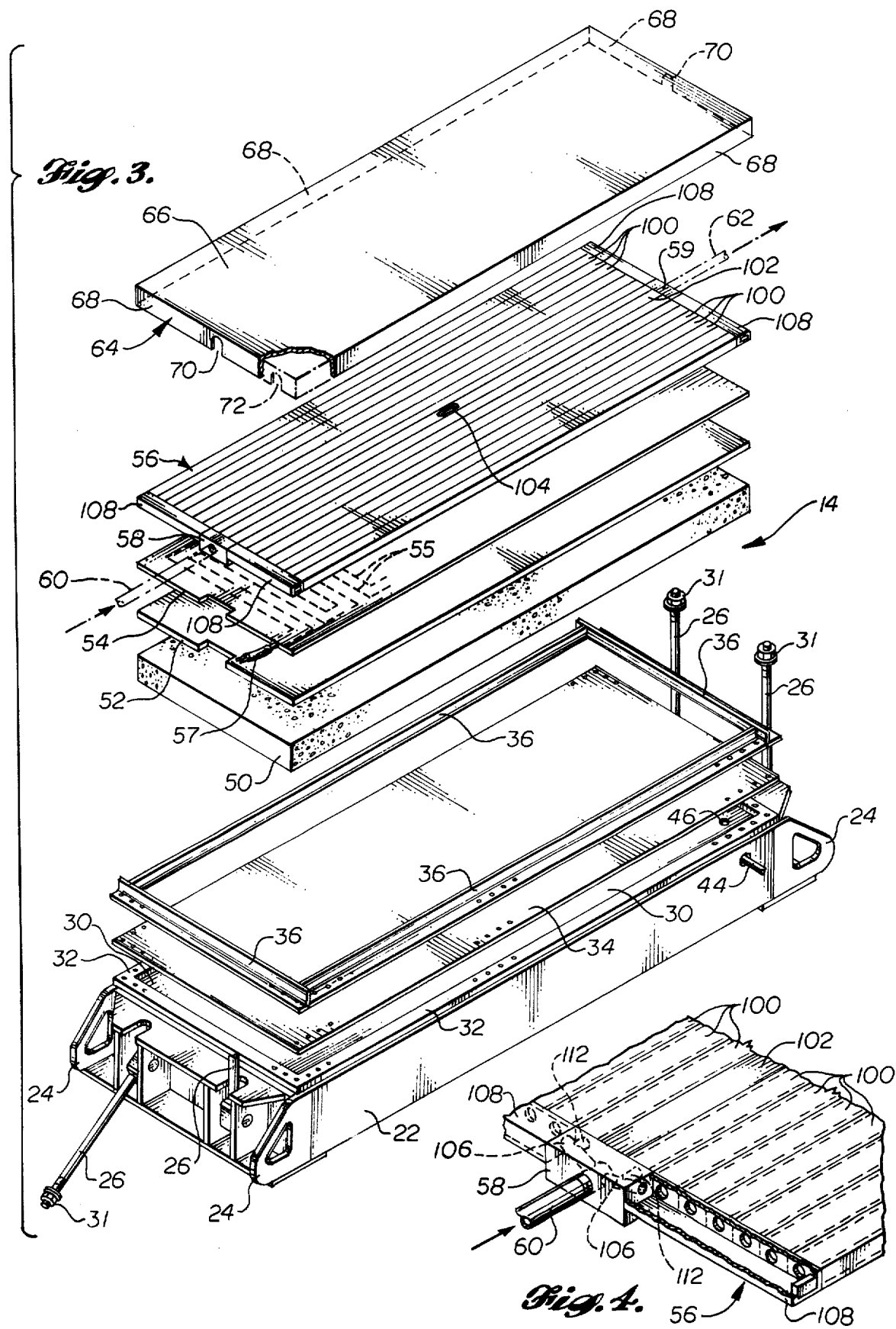

VULCANIZING APPARATUS

BACKGROUND OF THE INVENTION

The present invention relates to a vulcanizing apparatus, more particularly to a vulcanizing apparatus having a pair of opposing platen surfaces, at least one of which is provided with a heating means and at least one of which is provided with a cooling means, and most particularly to such a vulcanizing apparatus employing a unique pressure member for compressing a material to be vulcanized between the two platen surfaces.

A great variety of apparatuses are available to vulcanize rubber materials in the field for repair and maintenance. The typical apparatus used for vulcanizing splices in rubber belting or for splicing an elongate section of belting to form a continuous belt is relatively bulky and difficult to handle because of their substantial weight. In addition, most commercially available vulcanizers of this type employ a pair of platen surfaces, one of which is driven toward the other by a pressure member for compressing the materials or belts to be vulcanized. The pressure member comprising a bladder composed of rubber or other synthetic material is positioned in a chamber between a frame member supporting one of the platens and the platen itself. A pressurized fluid is then injected into the bladder causing the bladder to expand and bear against the frame member and the associated platen surface, thereby tending to move the associated platen surface toward a mutually opposing platen surface.

Although such apparatuses operate reasonably well, the down time and maintenance costs are relatively high. Normally a bladder type pressure member must be very carefully handled and positioned in relationship to the frame member and the associated platen. If the bladder is completely enclosed, great care must be taken to seal the enclosure to prevent portions of the bladder from extruding between the associated moveable platen and the frame member supporting the bladder and platen. Seal failure often in turn cause bladder failures. Moreover, bladders composed of resilient synthetic or natural elastomeric materials tend to deteriorate with time when subjected to repetitive heating and cooling during use. When a bladder, which is a relatively expensive replacement item, has deteriorated, the entire apparatus must be disassembled, the bladder removed, the expensive replacement bladder inserted and the machine reassembled. This procedure consumes a relatively large amount of time while rendering the machine useless during maintainence.

It is an object of the present invention to provide a vulcanizing apparatus that is relatively lightweight; a vulcanizing apparatus that is easily used by an operator, even an operator unfamiliar with the particular design; a vulcanizing apparatus that is inexpensive to maintain, and when maintenance is necessary, requires only inexpensive replacement parts; a vulcanizing apparatus comprising upper and lower platen assemblies, having interchangable heating elements, cooling elements and insulation elements; and a vulcanizing apparatus that has relatively few moving parts, is easy to assemble and disassemble, and that incorporates a pressure means without employing a closed elastomeric bladder.

SUMMARY OF THE INVENTION

In accordance with the foregoing objects, and other objects that will become apparent to one of ordinary skill in the art upon reading the following specification, the invention provides a vulcanizing apparatus comprising a first or upper platen assembly and a second or lower platen assembly. The upper platen assembly comprises at least a first frame member and a first means forming a first platen surface fixed to the first frame member. The second platen assembly includes a second frame member, a second means forming a second platen surface that is associated with the second platen assembly for movement toward and away from the second frame member in a direction generally transverse to the second platen surface. A flexible diaphragm, which is substantially co-extensive with the second platen surface, is spaced from the third member and associated therewith by a third means affixing the periphery of the diaphragm to the second frame member. The diaphragm and the second frame member are constructed so as to form a fluid chamber between the lower surface of the diaphragm and the second frame member. A heat exchange means for cooling the second platen surface, a heating means for heating the second platen surface and an insulating means are serially interposed between the second platen surface and the flexible diaphragm. A coupling means is provided to removably interconnect the first and second platen assemblies so as to orient the first and second platen surfaces in generally parallel, spaced, mutually opposing relationship. A means is also provided on the second platen assembly for admitting and exhausting pressurized fluid from the chamber between the diaphragm and the second frame member. As the fluid pressure in the second chamber is increased, the flexible diaphragm moves upwardly toward the first platen assembly, raising the second platen assembly and associated heat exchange and insulating means so as to compress a workpiece to be vulcanized between the first and second platen surfaces. The compressive force is released by releasing the fluid pressure in the chamber between the diaphragm and the second frame member. If desired, a heat exchange means, heating means and insulating means can also be serially interposed between the first platen member and the first frame member.

BRIEF DESCRIPTION OF THE DRAWINGS

A better understanding of the present invention can be derived by reading the ensuing specification in conjunction with the accompanying drawings wherein:

FIG. 3 is an exploded isometric view of the lower platen assembly; and

FIG. 4 is an enlarged, isometric, partially broken away view of a corner portion of the heat exchanger employed to cool the platen assemblies.

DESCRIPTION OF PREFERRED EMBODIMENTS

Figure 1:
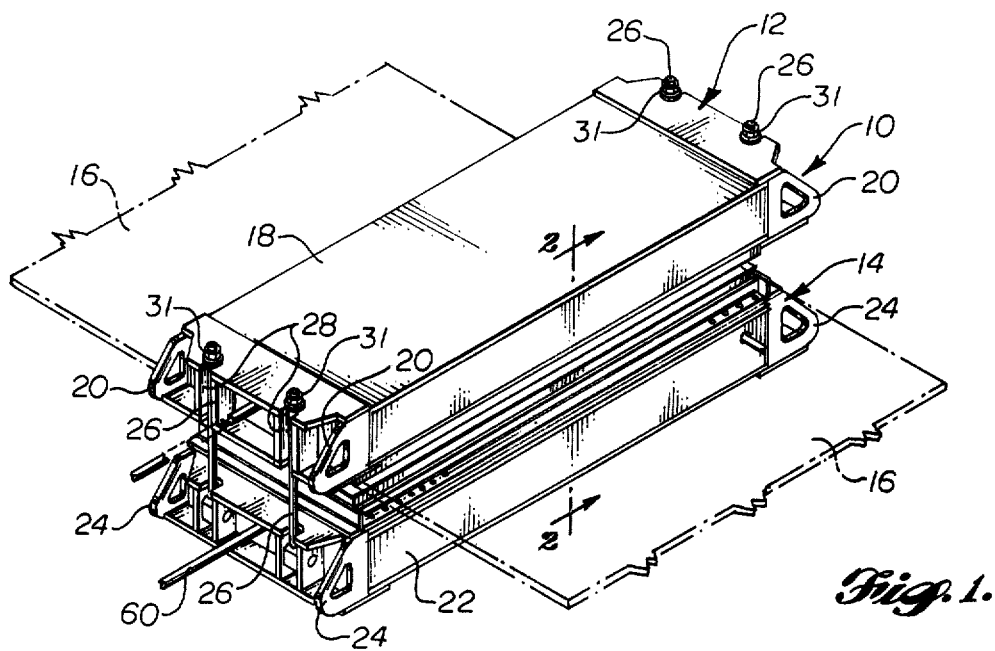
FIG. 1 is an isometric view of the vulcanizing apparatus of the present invention in operation, illustrating a conveyor belt sandwiched between the platen surfaces of the upper and lower platen assemblies.

Referring first to FIG. 1, the vulcanizing apparatus 10 comprises an upper platen assembly 12 and a lower platen assembly 14. A belt 16, shown in reference outline, is interposed or sandwiched between the upper platen surface associated with the upper platen assembly 12 and the lower platen surface associated with the lower platen assembly 14. The upper platen assembly includes an outer, structural, box-like frame member 18, which in operation has its longitudinal dimension oriented along the transverse dimension of the portion of the belt 16 to be vulcanized. The longitudinal ends of the frame member 18 each carry handles 20 for manually lifting the upper platen assembly 12 for transport from one location to another and to lift and position the upper platen assembly 12 over the belt 16. The lower platen assembly 14 also has an outer, structural, box-like frame member 22 that in operation has its longitudinal dimension oriented transversely relative to the portion of the belt 16 to be vulcanized. Each of the longitudinal ends of the lower frame member 22 also carry handles 24 for transporting and positioning the lower platen assembly 14 under the belt 16 to be vulcanized. The upper and lower platen assemblies are held in mutually opposed operating position by pairs of bolts 26 pivotally mounted to appropriate structure on each of the longitudinal ends of the lower frame member 22. The bolts are mounted by suitable hinge members for downward and outward swinging movement relative to the upper platen assembly 12 about an axis that is oriented transversely to the longitudinal dimension of the platen assemblies. Each of the longitudinal ends of the upper frame member 18 carry longitudinally outwardly extending flanges having vertically oriented slots 28 formed therein. The slots are mutually aligned in vertical orientation with respective ones of the bolts 26. To interconnect the upper and lower platen assemblies, the bolts 26 are swung upwardly and inwardly into seating engagement with the slots 28. Nuts 31 are threaded on the bolts and tightened down onto the upper surface of the longitudinally outwardly extended flanges on the upper platen frame member 18. In this manner, the upper platen assembly 12 can be secured to the lower platen assembly 14 after the belt 16 has been sandwiched between them.

Figure 2:
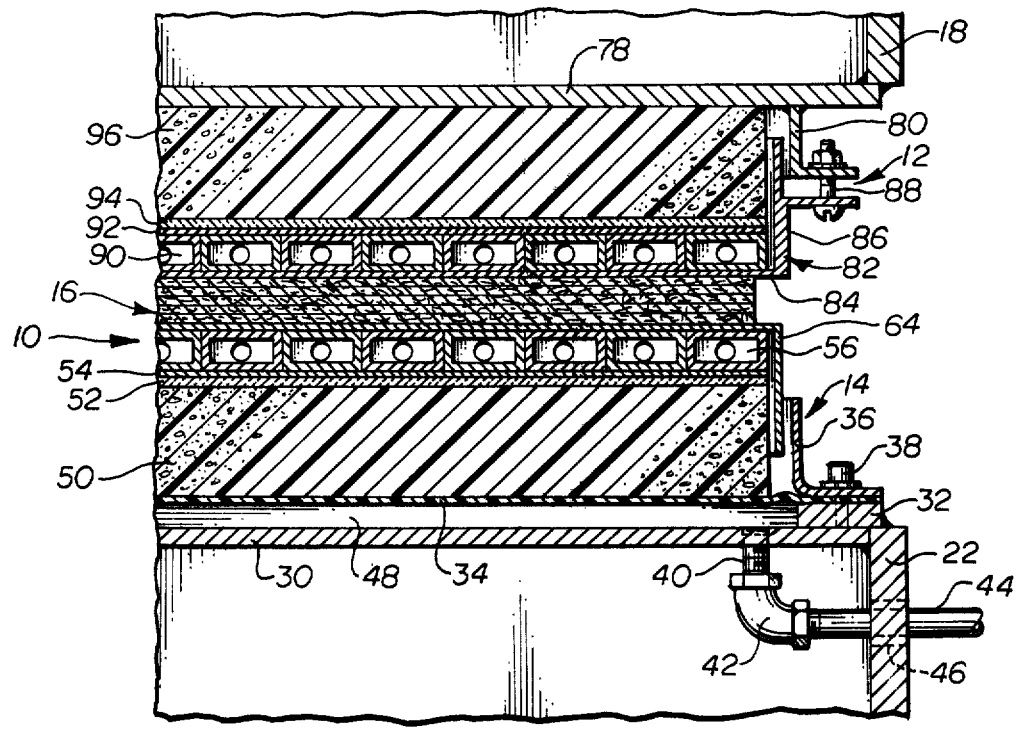
FIG. 2 is an enlarged view of a portion of the upper and lower platen assemblies taken along section line 2—2 of FIG. 1.

Referring now to FIGS. 2 and 3, the box-like frame 22 of the lower platen assembly 14 includes a substantially planar, solid upper plate 30 having a substantially flat planar upper surface. The upper surface area of the plate 30 is slightly larger than the platen surface that contacts the belt or other workpiece (as described below). A continuous, raised shoulder 32 is located around the periphery of the upper plate 30 of the lower frame member 22 so as to form a shallow internal recess or cavity 48 over the upper surface of the upper plate 30. A diaphragm 34 sized slightly larger than the exposed upper surface of the plate 30 is laid over the upper surface of the shoulder 32 formed on top of the upper plate 30. The diaphragm is sized slightly larger than the plate 30 so that when the peripheral edges of the diaphragm 34 are aligned with the peripheral edges of the shoulder 32, the central portion of the diaphragm 34 will be slightly flexible, i.e. not taut. A retaining member 36 is positioned over the diaphragm above the shoulder 32 on the plate 30. The retaining member 36 is composed of four L-shaped structural members having a horizontal flange in faying contact with the periphery of the diaphragm and a vertical flange portion integral with the horizontal flange portion that extends upwardly from the upper surface of the diaphragm 34. Two of the L-shaped members are positioned over the periphery of the diaphragm adjacent opposite ends of the assembly in transverse orientation to the assembly, while the other two of the L-shaped members are positioned over the periphery of the diaphragm adjacent opposite sides of the assembly and run between the transversely oriented members. A plurality of holes or bores, drilled through the horizontal flanges of the retaining member 36, through the diaphragm 34, and into the shoulder 32, receive threaded fastening members such as bolts 38, which secure the flange and thus the periphery of the diaphragm 34 to the shoulder 32 on the lower frame member 22. The diaphragm can be any of a variety of fluid impervious materials that are flexible and have a relatively high sheet or cohesive strength. An example of such a material includes commercially available resin impregnated fabrics. Preferably, the diaphragm material is not elastic since it is desirable that the material not stretch to any degree during operation.

An internally threaded bore is also provided in the upper plate 30 of the lower frame member 22 into which a threaded pipe 40 is threadably engaged. An elbow 42 couples the pipe 40 to a second pipe 44 that extends transversely through an aperture 46 provided in one of the side plates of the lower frame member 22 and through plate 30. Pressurized fluid is supplied through this coupling to the interior of the cavity 48 formed between the upper surface of the upper plate 30 and the lower surface of the diaphragm 34. When the cavity 48 is pressurized the central portion of the diaphragm 34 distends and moves upwardly and applies an upwardly directed force to structure resting on its upper surface equal to the fluid pressure within the cavity 48.

A block 50 of insulating material in the shape of a rectangular polyhedron is positioned over and rests on top of the upper surface of the diaphragm 34. The insulating block 50 can be composed of any of a variety of suitable materials. In the preferred embodiment, a cellular synthetic polymeric composition such as a polyurethane, which has high thermal resistance and sufficient strength in compression to withstand deformation, is employed. The peripheral dimensions of the insulating block 50 are slightly less than the interior dimensions between the upwardly extending flanges of the diaphragm retaining member 36. Thus, the foam block 50 fits inside the retaining member 36 and can move relative to the lower frame member 22. A second layer 52 of insulation comprising a heat resistant material such as cement-asbestos or other asbestos composition is sized to coextend with the upper surface of the insulating block 50. The heat resistant insulating material is laid over the upper surface of the insulating block 50. Superposed on and coextensive with the insulating layer 52 is a heating pad 54 of conventional design. The heating pad 54 contains a plurality of internal electrical resistance heaters 55 coupled to a power cord 57. The layer 52 need not be employed if the insulating block can withstand the high temperatures generated by the heating pad 54. Superposed on the heating pad 54 is a heat exchanger 56 comprising a plurality of parallel tubes 100 coupled to manifolds 108 at each end. The manifolds at each end are coupled through manifold blocks 58 and 59 to an inlet pipe 60 at one end and to an outlet pipe 62 at the other end. The heat exchanger 56 is designed to receive a cooling fluid such as water to cool the belt being vulcanized after the vulcanization reaction has been completed. The lower platen member is formed by a box-like member 64 having an upper planar sheet portion 66, the bottom surface of which rests on the heat exchanger and the upper surface of which forms the upwardly facing, lower platen surface for the lower platen assembly 14. The box-like platen member 64 has downwardly extending sides and end portions and is open at the bottom. The lower platen member 64 is sized so that the downwardly extending side and end members 68 will fit around the periphery of the heat exchanger 56, the heating pad 54, the heat resistant insulating sheet 52, and at least a portion of the insulating block 50. A notch 70 is provided in the central portion of each of the downwardly extending end walls of the platen member to clear the inlet and outlet pipes 60 and 62 on the heat exchanger 56. Likewise, an upwardly extending notch 72 is provided in the one end wall so as to accommodate the power cord 57 and the thermocouple leads exiting from the heating pad 54.

Thus, as best seen in FIGS. 2 and 3, the lower surface of the lower platen member 64 and the upper surface of the diaphragm 34 retain in sandwiched relationship the heat exchanger 56, the heating pad 54, the heat resistant layer 52 of insulation, and the insulating block 50. When the chamber 48 is pressurized, the fluid pressure will be transmitted by the diaphragm to the block and ultimately to a belt 16 interposed between the upper and lower platen assemblies. The side and end walls 68 of the lower platen member 64 are positioned so that they fit inside the inner surfaces of the upwardly extending or vertical flange portions of the diaphragm retaining members 36. Thus the lower platen member 64 also serves to restrain the elements interposed between it and the diaphragm from excess lateral movement during use.

Referring back only to FIG. 2, the upper platen assembly 12 is constructed similarly to the lower platen assembly, except that in the preferred embodiment, a diaphragm and fluid pressure chamber are not included in the upper platen assembly. The frame member 18 has a bottom structural plate 78 that in use is oriented in a substantially horizontal position and is substantially parallel to the upper plate 30 on the lower platen assembly 14. A downwardly extending, L-shaped, attachment flange 80 is affixed to the bottom surface of the bottom plate 78 adjacent its periphery. The upper platen member 82 is a box-like member including a bottom relatively rigid sheet 84, the bottom surface of which forms the upper platen surface. The box-like platen member 82 has upwardly extending sides 86 and ends (not shown) that extend upwardly to a location spaced downwardly from the lower surface of the main support plate 78 of the upper frame member 18. The outer surfaces of the sides 86 and ends are spaced inwardly from the downwardly extending portion of the L-shaped flange 80. The sides 86 contain an integral flange that extends outwardly from the sides 86 of the outer surface and ends of the box-like platen member 82. A plurality of bolts 88, only one of which is shown in FIG. 2, interconnect this outwardly extending flange with the outwardly extending horizontal portion of the L-shaped flange 80 extending downwardly from the frame member 18, thus securing the upper platen member 82 in position.

Like the lower platen assembly, the upper platen assembly 12 has a heat exchanger 90 superposed on the upper surface of the platen sheet 84 of the upper platen member 82, a heating pad superposed on the upper surface of the heat exchanger 90, a heat resistant layer 94 of material such as asbestos superposed on the upper surface of the heating pad 92, and a block of insulating material 96 superposed on the upper surface of the heat resistant layer. When the bolts 88 are tightened, the heat exchanger, heating pad, heat resistant layer and insulating layer are tightly sandwiched between the upper surface of the platen sheet 84 and the lower surface of the main support plate 78 of the upper frame member 18.

In use, the lower platen assembly of the vulcanizing apparatus is positioned on a floor or other suitable work support. A splice is prepared in a belt in a conventional manner so that portions of the belt overlap. The portion of the belt containing the splice is then laid over the lower platen surface of the lower platen assembly. Thereafter, the upper platen assembly is positioned over the portion of the belt containing the splice and is aligned with the lower platen assembly. The pivotally mounted coupling bolts are then swung into position in their respective slots in the upper platen assembly and the securing nuts snugged down. In this manner, the portion of the belt containing the splice is sandwiched between the upper and lower platen surfaces of the two platen assemblies. If the apparatus has been used previously, any heat exchange fluids must be exhausted from the heat exchangers. Thereafter, electrical power is supplied to the heating pads through the heat exchanger and the platen surfaces to the belt. At the same time, a source of fluid pressure such as compressed air is coupled to the fluid inlet pipe to the pressure chamber in the lower platen assembly. The fluid pressure in the pressure chamber is raised to a desired value, normally on the order of 100 p.s.i. so that pressure is transmitted from the pressure chamber through the diaphragm and up to the lower platen member, compressing the belt between the upper and lower platen surfaces. When vulcanization of the splice in the belt is completed, the heating pads are de-energized and a cooling fluid such as water is injected into the inlet port of the heat exchangers in the upper and lower platen assemblies. After the platen assemblies and belt are cooled, the pressure is released from the pressure chamber, the coupling bolts are released and the upper platen assembly is removed, completing the vulcanization process.

Referring now to FIGS. 3 and 4, the heat exchanger 56 has a unique construction in that it is manufactured from a plurality of tubes 100 having a rectangular cross section. The plurality of tubes 100 are arranged so that their longitudinal dimension extends along the longitudinal dimension of the platen assemblies. Mutually opposing vertical sides of the tubes are abutted in faying contact so that the upper and lower surfaces of the tubes form a smooth upper and lower surface on the heat exchanger. The central longitudinally extending rectangular bar 102 is solid. The solid bar 102 has a downwardly extending recess 104 formed in its upper surface. This recess is centrally located relative to the upper surface of the heat exchanger. The recess is provided for embedding a thermocouple therein so that the temperature of the platen surface can be monitored while the vulcanizing apparatus is in use. A thermocouple is provided in both the upper and lower heat exchangers in the upper and lower platen assemblies. The tubes are of equal length and their longitudinal ends are aligned. Manifold blocks 58 and 59 are abutted against the end of the solid central bar and the ends of the adjacent longitudinally extending tubes. Transversely extending, rectangular tubes 108 are positioned on both sides of the manifold blocks in abutting contact with the blocks and the ends of the longitudinally extending tubes. The transverse end tubes 108 extend outwardly in mutually opposing directions to the outer side of the outer longitudinally extending tubes. The transverse end tubes 108 have bores through the inwardly facing sides thereof that place the interior of the end tubes in fluid communication with the hollow interior channels in the longitudinally extending tubes. The manifold block 58 provided with an inlet conduit coupled to the inlet pipe 60 and internal bores 106 that communicate with the interiors of the end tubes 108. In addition, since the manifold block 58 covers the ends of two of the centrally located longitudinally extending tubes, bores 112 are also provided that communicate between the outwardly extending bores 106 in the manifold blocks 58 and 59 and the interior of the two central, longitudinally extending tubes 100.

The upper and lower heat exchangers 56 and 90 are identically constructed. The heat exchangers 90 and 56 as well as the upper and lower frame members 18 and 14 can be fabricated from any suitable metal. However, for overall lightness and for a high heat transfer coefficient in the heat exchangers, aluminum is chosen for the preferred embodiment. The platen members are stamped or otherwise formed from a hard metallic material which provides the requisite rigidity for a platen surface as well as a heat transfer capability. In the preferred embodiment, stainless steel is chosen for both the upper and lower platen members 82 and 64.

The present invention has been described in relation to a preferred embodiment. One of ordinary skill in the art after reading the foregoing specification will be able to effect various changes, substitutions of equivalents and other alterations without departing from the overall intent and scope of the inventive concept disclosed herein. It is therefore intended that the protection granted hereunder be limited only by the definition contained in the appended claims.

What is claimed is:
1. A vulcanizing apparatus comprising:
   a. a first platen assembly including
      1. a first frame member; and
      2. first means forming a first platen surface, said first means being fixed to said first frame member,
   b. a second platen assembly including
      1. a second frame member,
      2. second means forming a second platen surface, said second means being associated with said second platen assembly for movement toward and away from said second frame member in a direction generally transverse to said second platen surface,
      3. a flexible diaphragm associated with said second frame member, said diaphragm being spaced therefrom and being substantially coextensive with said second platen surface, said diaphragm having a periphery,
      4. third means affixing the periphery of said diaphragm to said second frame member, said diaphragm and said second frame member being so constructed as to form a fluid chamber between a first surface of said diaphragm and said second frame member,
      5. heat exchange means for cooling said second platen surface, said heat exchange means having a heat transfer surface that is substantially coextensive with said second platen surface,
      6. heating means forming a heat transfer surface substantially coextensive with said second platen surface,
      7. insulating means forming a layer of insulation interposed between said diaphragm and said second means, said heating means and said heat exchange means being sandwiched between said insulating means and said second means,
   c. fourth means removably coupling said first and second platen assemblies so as to orient said first and second platens surfaces in generally parallel, spaced, mutually opposing relationship, and
   d. fifth means associated with said second platen assembly for admitting and exhausting fluid from said chamber for increasing and decreasing the fluid pressure in said chamber to move said diaphragm relative to said second frame member and to thereby move said second platen surface toward and away from said platen surface.

2. The apparatus of claim 1 further comprising:
   guide means coupled to said first frame member and associated with said second means for restraining said second means from lateral movement relative to said platen surface while allowing said platen surface to move in a direction responsive.

3. The apparatus of claim 2 wherein said second means comprises a rigid sheet having one surface that forms said second platen surface, said rigid sheet having flanges thereon extending transversely away from said sheet in a direction opposite to the direction in which second platen surfaces faces, said flanges being located about the periphery of said sheet, said flanges being positioned outwardly relative to said second platen surface from the peripheral edge portions of said heating means, said heat exchanger means, and said insulating means, and wherein
   said guide means comprises flange member and extending transversely toward said second platen surface, said flange member being positioned outwardly from said flanges on said sheet, said flange members thereby restraining lateral movement of said sheet as said sheet is moved by admitting and exhausting a pressurized fluid from said chamber.

4. The apparatus of claim 1 wherein said insulating means comprises a block of foamed synthetic polymer, said foamed polymer having high thermal resistance and sufficient compressive strength to withstand deformation when sandwiched under pressure between said diaphragm and said second means.

5. The apparatus of claim 4 wherein said polymer comprises a polyurethane.

6. The apparatus of claim 1 wherein said first platen assembly further comprises:
   heat exchange means for cooling said first platen surface, said heat exchange means having a heat transfer surface that is substantially coextensive with and positioned in heat exchange relationship with said first platen surface, with said first means,
   heating means forming a heat transfer surface in heat exchange relationship with said heat exchange means, and
   insulating means forming a layer of insulation interposed between said first frame member and said first platen surface, said heating means and said heat exchange means being interposed in sandwiched relationship between said insulating means and said first platen surface.

7. The apparatus of claim 6 wherein said first means comprises:
a rigid sheet having one surface thereof that forms said first platen surface, said rigid sheet having flanges thereon extending transversely away from said sheet in a direction opposite to the direction in which said first platen surface faces, said flanges being located about the periphery of said sheet and means fixing said flanges to said first frame member.

8. The apparatus of claim 6 wherein said insulating means in said insulating means in said first platen assembly comprises a block of foamed synthetic polymer, said foamed polymer having high thermal resistance and sufficient compressive strength to withstand deformation when sandwiched under pressure between said first frame member and said first means.

9. The apparatus of claim 8 wherein said polymer comprises a polyurethane.

10. The apparatus of claim 6 wherein each of said heating means comprises a relatively thin heating pad having electrical heating elements embedded therein.

11. The apparatus of claim 6 wherein each of said heat exchange means comprises:
a plurality of rectangular tubes composed of a material having a high heat transfer coefficient, said tubes being arranged in parallel relationship with adjacent ones of said tubes having their mutually opposing outer surfaces in faying contact, said tubes thereby forming a box-like structure having an upper and lower surface, a longitudinal dimension and a lateral dimension,
rectangular tubes positioned at each of the longitudinal ends of the box-like structure and oriented transversely to said plurality of tubes, said tube at each end having a plurality of bores therethrough placing the channels within the plurality of tubes in fluid communication with the interior channel of said tube at each end, coupling means associated with each one of said tubes at each end for placing one of said tubes in fluid communication with a source of heat exchange fluid and for exhausting heat exchange fluid from the other of said tubes.

* * * * *